(12) United States Patent
Benner et al.

(10) Patent No.: US 7,640,800 B2
(45) Date of Patent: Jan. 5, 2010

(54) FILLING LEVEL SENSOR

(75) Inventors: Hans-Guenter Benner, Kriftel (DE); Bernd Pauer, Eppstein (DE)

(73) Assignee: Siemens Aktiengesellschaft, Munich (DE)

( * ) Notice: Subject to any disclaimer, the term of this patent is extended or adjusted under 35 U.S.C. 154(b) by 368 days.

(21) Appl. No.: 11/542,347

(22) Filed: Oct. 2, 2006

(65) Prior Publication Data
US 2007/0107503 A1  May 17, 2007

(30) Foreign Application Priority Data
Sep. 30, 2005  (DE) .................. 10 2005 047 467

(51) Int. Cl.
*G01F 23/32* (2006.01)
*G01F 23/30* (2006.01)

(52) U.S. Cl. .................. 73/317; 73/305; 73/308; 73/310; 73/314

(58) Field of Classification Search ............... 73/290 R, 73/305, 308, 314, 317, 310
See application file for complete search history.

(56) References Cited

U.S. PATENT DOCUMENTS

| | | | | |
|---|---|---|---|---|
| 3,572,122 A | * | 3/1971 | Nusbaum ..................... | 73/314 |
| 5,426,271 A | * | 6/1995 | Clark et al. ............... | 200/84 C |
| 5,814,830 A | * | 9/1998 | Crowne ...................... | 250/577 |
| 6,401,533 B1 | | 6/2002 | Gier et al. | |
| 6,578,417 B1 | * | 6/2003 | Eck .............................. | 73/305 |
| 6,990,862 B2 | * | 1/2006 | Bergsma et al. ............... | 73/317 |
| 7,165,450 B2 | * | 1/2007 | Jamnia et al. ................. | 73/317 |
| 7,315,165 B2 | * | 1/2008 | Kleinen et al. ......... | 324/207.26 |
| 2005/0122693 A1 | | 6/2005 | Gilmour et al. | |
| 2005/0150294 A1 | * | 7/2005 | Bouton et al. ................. | 73/317 |
| 2006/0225501 A1 | * | 10/2006 | Bahl et al. .................... | 73/313 |
| 2007/0074568 A1 | * | 4/2007 | Benner et al. ............. | 73/290 R |

FOREIGN PATENT DOCUMENTS

DE 197 01 246 A1 7/1998

* cited by examiner

*Primary Examiner*—John Fitzgerald
(74) *Attorney, Agent, or Firm*—Cohen Pontani Liberman & Pavane LLP

(57) ABSTRACT

A filling level sensor having a lever arm which has a float at one end and is held at its other end by a clip. A resistance network is arranged on a substrate and to which a contact structure is assigned, the resistance network producing an electrical signal for the filling level as a function of the pivoted position of a lever arm. The clip is composed of an electrically conductive plastic and has an electrical contact connected to the clip in an electrically conductive way, such that as the lever arm pivots said contact describes a circular path on the substrate. The area on the substrate over which the electrical contact passes is an electrically conductive contact face and is electrically conductively connected to a connecting line of the filling level sensor.

7 Claims, 2 Drawing Sheets

FILLING LEVEL SENSOR

The subject matter of the invention is a filling level sensor having a lever arm which has a float, a carrier composed of plastic, a bearing, arranged on the carrier, for the lever arm, a filling level sensor which is arranged on the carrier and which is composed of a lid and a substrate, a resistance network which is arranged on this substrate and to which a contact structure is assigned, the electrical connection of the contact structure to the resistance network producing an electrical signal for the filling level as a function of the pivoted position of a lever arm, and having at least one permanent magnet which has the purpose of activating the contact structure.

Filling level sensors of the type mentioned at the beginning have been the state of the art for a long time and are thus known. Since safety requirements are becoming more stringent, filling level sensors in fuel tanks must increasingly also be protected against excessively high electrostatic charges. Electrostatic charges can occur on a lever sensor on the lever arm as a result of the movement through the fuel. Since the carrier and a bearing which is possibly present for the lever arm are composed of plastic, the charges cannot be conducted away from the lever arm. In closed systems there is no electrically conductive connection, which could be used to discharge electrostatic charges, between the lever arm and the resistance network or the ground line which leads to the resistance network.

The object of the invention is to provide a filling level sensor which is sufficiently protected against electrostatic charges. The protection against electrostatic charges should be provided as cost-effectively as possible here.

The object is achieved according to the invention in that the clip is composed of an electrically conductive plastic, in that an electrical contact which is connected to the clip in an electrically conductive connection is arranged on the clip in such a way that as the lever arm pivots on the substrate said contact describes a circular path, in that the area on the substrate over which the electrical contact passes is embodied as an electrically conductive contact face and is electrically conductively connected to a connecting line of the filling level sensor.

If the clip is constructed from electrically conductive plastic, electrostatic charges on the lever arm can flow away via the clip and be diverted across the electrical contact and via a connecting line so that they can be conducted away safely via the contacts of the filling level sensor. The risk of uncontrolled flashovers in the fuel tank is thus eliminated. There is no need for additional components to divert the electrostatic charges.

In one advantageous embodiment, the radius of the circular path of the electrical contact is smaller than the radius of the circular path of the permanent magnet. As a result, the electrical contact is arranged between the bearing of the clip and the permanent magnet. Owing to the relatively small radius, the contact face on the substrate can also be made small, as a result of which the costs for protecting against electrostatic charges are kept low.

A further reduction in cost is achieved by virtue of the fact that the permanent magnet forms the electrical contact. In this embodiment, it is possible to dispense with the provision and arrangement of a separate electrical contact.

The diversion of electrostatic charges via the permanent magnet is additional improved by virtue of the fact that at least parts of the surface of the permanent magnet are metallic.

The filling level sensor is configured in a particularly simple way if the conductive plastic is electrically conductive polyoxymethylene. With this embodiment is it possible to use the same basic material for the electrically conductive area as for the carrier. It is thus not necessary to provide a further substance. The filling level sensor is therefore particularly cost-effective.

Electrically conductive polyoxymethylene is obtained by adding graphite to the polyoxymethylene. Graphite as an additive is distinguished by the fact that it can easily be added by mixing and that polyoxymethylene which is changed in such a way has equally good processing characteristics.

In another embodiment, polyoxymethylene becomes electrically conductive through the addition of metal powder.

The invention will be explained in more detail using two exemplary embodiments. In the drawings.

Figure 1:
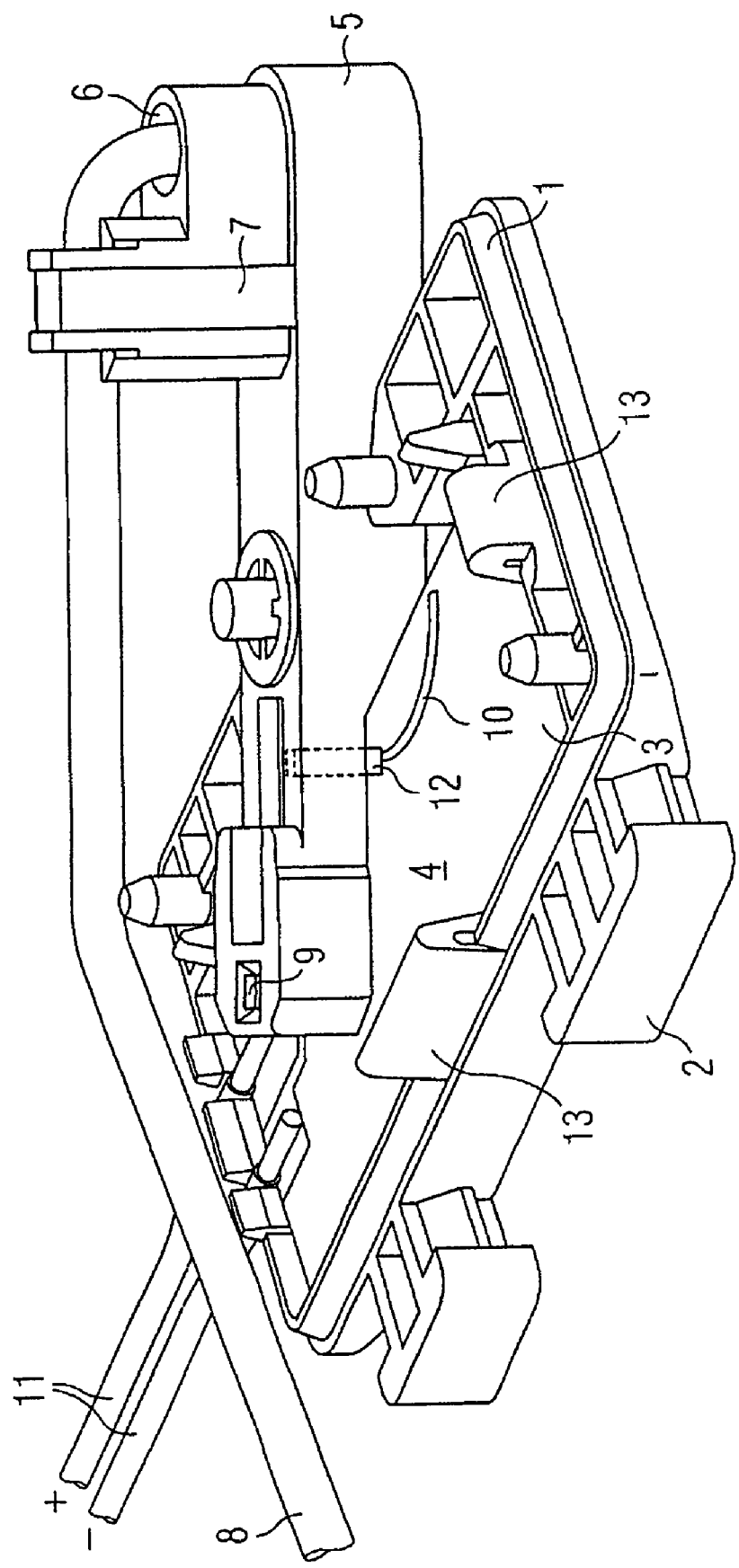
FIG. 1 shows a filling level sensor according to the invention.

The filling level sensor in FIG. 1 is composed of a carrier 1 made of polyoxymethylene. Protrusions 2 on the side are used to attach the carrier in a fuel tank. The carrier 1 has a central recess into which the filling level sensor 3 is inserted. The filling level sensor 3 is secured to the carrier 1 by means of latching elements 13.

The filling level sensor 3 is composed of a substrate 4 on whose underside a resistance network is mounted and a contact structure is arranged. The substrate is covered with a metallic lid in order to protect the resistance network and the contact structure.

Furthermore, the carrier 1 has a bearing in which the clip 5 is rotatably mounted in the carrier 1. The clip 5 is composed of an electrically conductive polyoxymethylene, the electrical conductivity of the polyoxymethylene being brought about by adding graphite. The clip 5 has a bore 6 and latching elements 7 by means of which a lever arm 8 is permanently arranged on the clip 5. A float (not illustrated) is arranged on the free end (also not illustrated) of the lever arm 8. If the filling level changes, the float is moved, as a result of which the lever arm 8, and with it the clip 5, is pivoted by means of the filling level sensor 3. In the process, a permanent magnet 9 which is arranged on the clip 5 activates the contact structure, as a result of which a signal is produced for the filling level.

An electrically conductive contact face 10 in the form of a circular path is arranged on the substrate 4 of the filling level sensor 3, one end of the contact face 10 being electrically conductively connected to a connecting line 11 for the filling level sensor 3. An electrical contact 12 is arranged in the clip 5 between the permanent magnet 7 and the bearing for the clip 5, said electrical contact 12 being moved over the circular-path-shaped contact face 10 when the clip 5 makes a pivoting movement. Electrostatic charges which occur on the lever arm 8 can thus be conducted away via the clip 5, the electrical contact 12, the contact face 10 and the connecting line 11.

Figure 2:
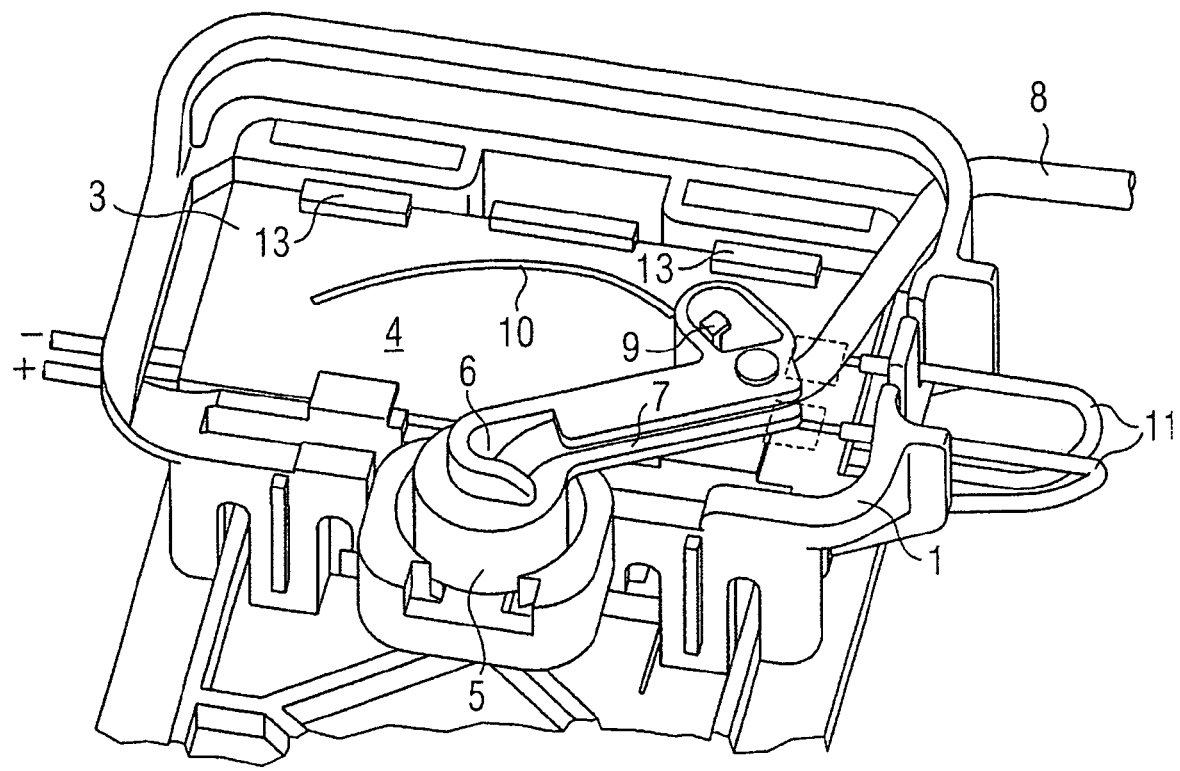
FIG. 2 shows a second embodiment of a filling level sensor.

FIG. 2 shows a second filling level sensor. In contrast to the filling level sensor according to FIG. 1, the permanent magnet 9 acts simultaneously as an electrical contact. The electrical contact face 10 is embodied here in such a way that it corresponds to the circular path over which the permanent magnet 9 passes. The contact face is also connected to a connecting line 11 so that the electrostatic charges which occur on the lever arm 8 can be diverted safely.

The invention claimed is:

1. A filling lever sensor assembly comprising:
   a lever arm;
   a float at one end of the lever arm;
   a clip composed of an electrically conductive plastic at another end of the lever arm configured to hold the lever arm, a carrier comprised of plastic;
a bearing, arranged on the carrier, configured to mate with at least one of the clip and the lever arm;
a filling level sensor arranged on the carrier comprising:
  a lid;
  a substrate;
  an electrically conductive contact face arranged on an outer surface of the substrate;
  a resistance network arranged on an inner surface of the substrate and to which a contact structure is assigned, an electrical connection of the contact structure to the resistance network producing an electrical signal indicating a filling level as a function of the pivoted position of a lever arm; and
  at least one permanent magnet arranged on the clip and has the purpose of activating the contact structure,
wherein an electrical contact is electrically connected to the clip such that as the lever arm pivots on the substrate said contact describes a circular path corresponding to and electrically connected to the electrically conductive contact face, the electrically conductive contact face is electrically conductively connected to a connecting line of the filling level sensor to discharge an electrostatic charge.

2. The filling level sensor as claimed in claim 1, wherein the radius of the circular path of the electrical contact is smaller than the radius of the circular path of the permanent magnet.

3. The filling level sensor as claimed in claim 2, wherein the electrically conductive polyoxymethylene contains metal powder.

4. The filling level sensor as claimed in claim 1, wherein the electrical contact is the permanent magnet.

5. The filling level sensor as claimed in claim 4, wherein at least parts of the surface of the permanent magnet are metallic.

6. The filling level sensor as claimed in claim 1, wherein the conductive plastic is electrically conductive polyoxymethylene.

7. The filling level sensor as claimed in claim 6, wherein the electrically conductive polyoxymethylene contains graphite.

* * * * *